Oct. 18, 1966    A. W. HAYDON ET AL    3,280,353
ELECTRIC ROTATING MACHINE
Filed Oct. 4, 1961    2 Sheets-Sheet 1
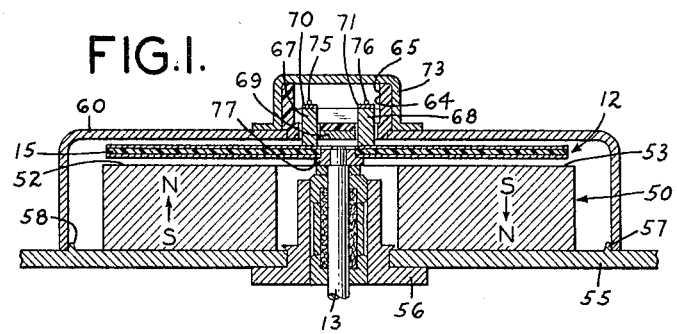
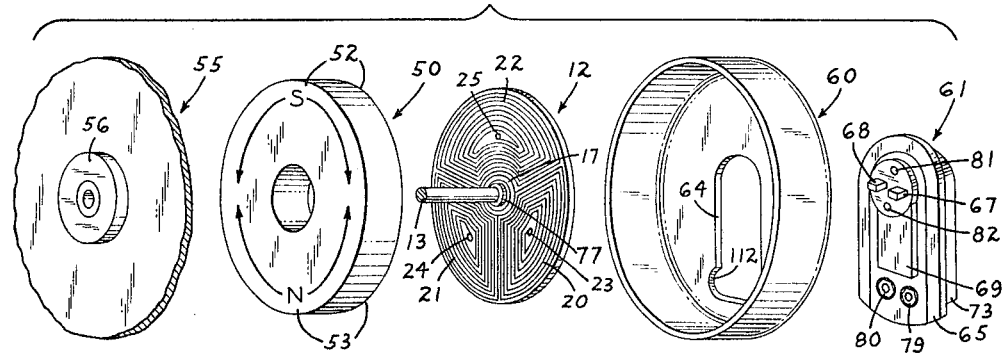
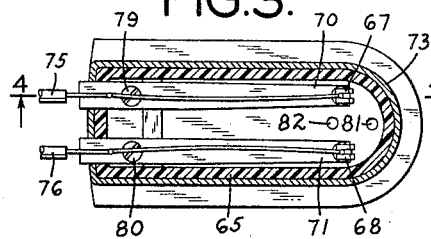
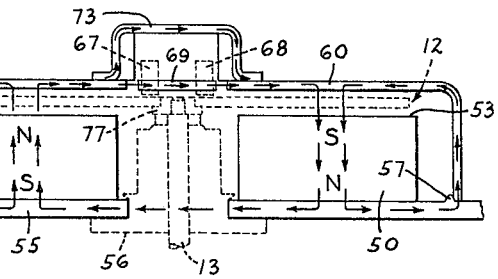
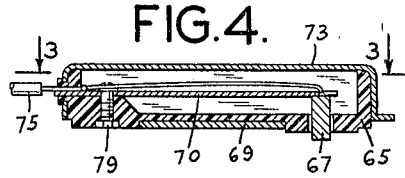
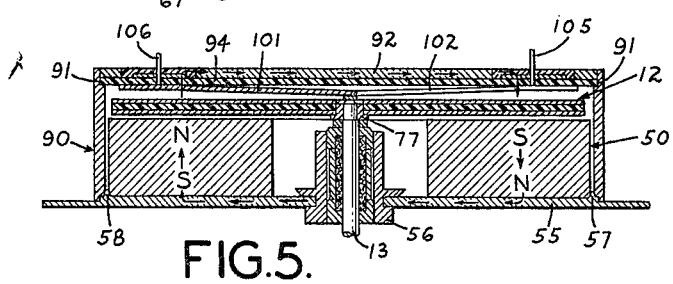

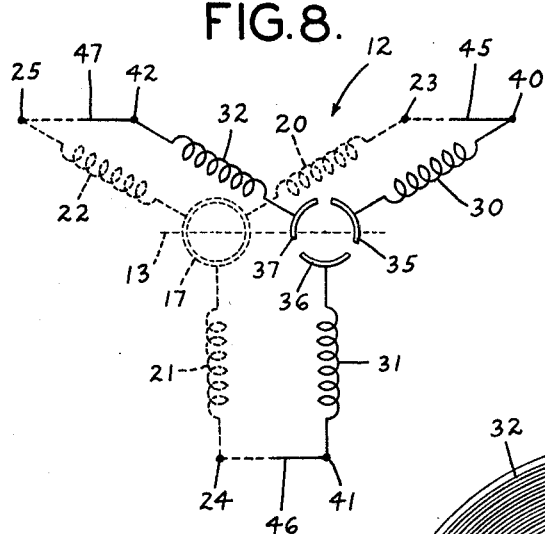
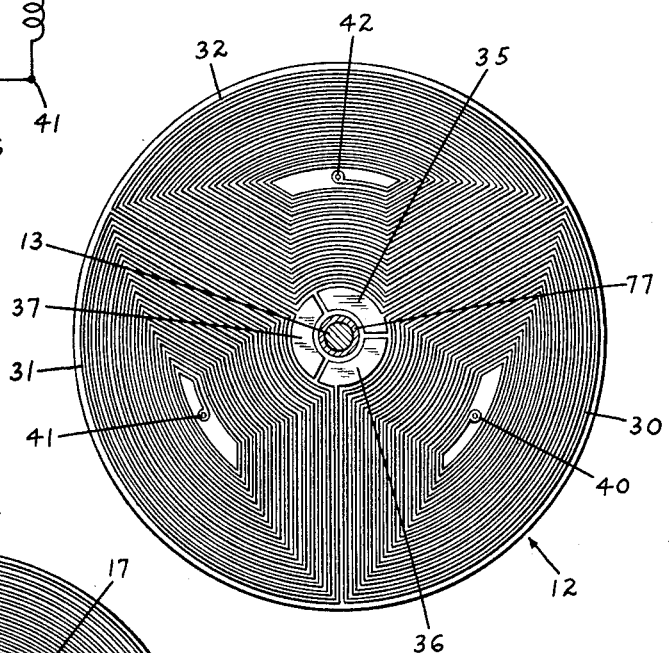
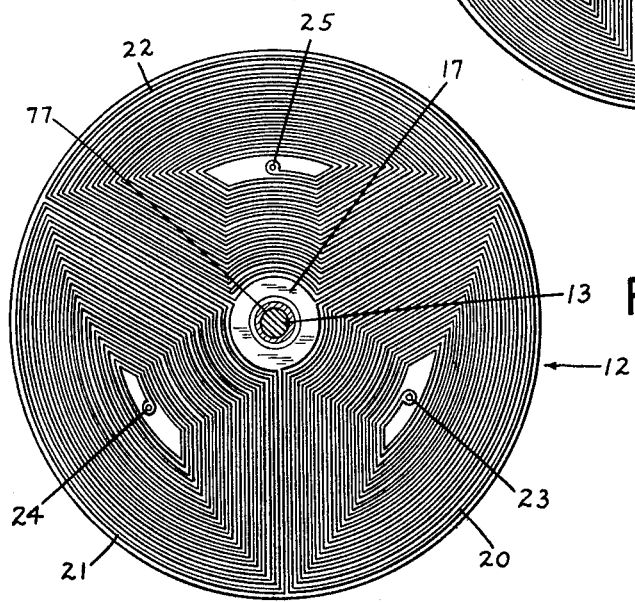

3,280,353
ELECTRIC ROTATING MACHINE
Arthur W. Haydon, Milford, and Charles S. Daniels, Woodbury, Conn., assignors, by direct and mesne assignments, to Tri-Tek, Inc., a corporation of Connecticut
Filed Oct. 4, 1961, Ser. No. 142,871
6 Claims. (Cl. 310—154)

This invention relates to electric rotating machines. It is particularly applicable to small D.C. motors capable of being operated from battery and low voltage supplies.

The invention is especially useful in miniature D.C. motors having a thin, disc-shaped rotor. A motor constructed in accordance with the principles of the present invention is particularly suitable in a wide variety of applications, including timing devices, electric shavers, portable recorders, motor-driven toy devices, and other apparatus in which an economical motor of small size, capable of operation from a low voltage supply, is an important requirement.

Prior motors known to the art suffer from the limitations that, as the size and weight of the overall assembly are reduced, for purposes of miniaturization, the machining and fabrication of the constituent elements and their assembly into the motor become increasingly complex and expensive. In addition, such motors are usually incorporated into machines and instruments whose size and weight are of predominant concern because of their portable nature, and accordingly, such motors must be positioned within the apparatus in locations which are relatively inaccessible for purposes of repair and replacement should the motors fail in operation. Also, the installation of such conventional motors in hard-to-reach emplacements is a time-consuming process because of the necessity of properly orienting various screws, nuts, and other fastening devices. The need for machining, assembling, installing, and removing the parts of such motors, not to mention maintaining a supply of stock parts of various fasteners such as nuts and bolts, clamps, etc., adds materially to the cost of production and maintenance of these motors which, for the applications cited, should ideally be relatively inexpensive.

The present invention overcomes these major disadvantages by the utilization of a novel concept which eliminates the necessity of using fasteners of any type in the assembly and installation of a small electrical motor, with resulting important savings in both time and expense. In accordance with the principles of the present invention, the various parts of the motor in certain embodiments of the invention are so constructed and interrelated that the magnetic flux, which is generated by the stator or field piece of the motor and which interacts with current flowing through the conductive windings of the rotor or armature to produce the desired rotary motion, is further employed to hold the entire motor assembly together and in place through the forces of magnetic attraction exerted on portions of the motor assembly and its mounting plate. The magnetic flux produced by the stator thus serves a double function—the conventional one of providing the magnetic field for electromagnetic interaction with the currents flowing in the rotor and the additional purpose of holding the motor assembly itself rigidly together and securing it firmly to a mounting installation.

The housing of the proposed motor is, in a typical embodiment, comprised of a ferromagnetic material, that is, having a permeability greater than that of air, such that a low reluctance path for the magnetic flux produced by the stator exists. The ferromagnetic nature of the motor housing causes an attractive force to be exerted on the housing by the magnetic lines of force established between the north and south poles of the stator. By design, this magnetic attraction which exists between the ferromagnetic portions of the motor assembly and the magnetized stator is utilized to hold the motor assembly together, to maintain the proper spatial relationships between the rotor, the stator, and the brushes of the motor, and further to secure the motor to its mounting plate, which typically can be an integral portion of the apparatus which the motor is to drive. Towards this last stated end, the mounting surface to which the motor is to be attached is chosen in some embodiments to be of a ferromagnetic material such that the attractive forces set up by the magnetic field of the stator will serve to secure the motor in place. In other variations, a housing for the motor assembly may comprise two or more cover members of ferromagnetic material which are held together by magnetic action and the motor housing attached to a nonmagnetic mounting surface by conventional mechanical fastening means.

In one embodiment of the invention the brush assembly is housed in a container which is partially ferromagnetic in nature such that it is similarly held to the motor assembly by magnetic action. Thus, parts of the motor assembly are secured or restrained in proper relationship by the attactive forces exerted on ferromagnetic portions of the assembly and its mounting by magnetic flux generated by the stator.

With this design of a motor containing magnetically-held-together components, extremely rapid and inexpensive assembly, installation, alignment, repair and removal are achieved. Thus, for example, if the brushes should wear out after prolonged operation of the motor, the motor design enables one easily to pull off and replace only that portion of the motor assembly. Another advantage of the motor is related to the fact that, in D.C. motors mass-produced in accordance with this invention, the orientation of the brushes with respect to the stator can be adjusted for peak performance by simply rotating the cover member with respect to the stator field piece. For fixed voltage and load, optimum performance is then obtained at the point of minimum current.

Furthermore, it has been found that because of the high reluctance of the stator magnet, the lack of iron in the rotor, and the relatively large air gap, of the proposed motor, brush arcing is decreased and, due to the low reactance of the rotor windings, radio frequency interference is reduced to a minimum. This last is an important advantage in those applications where small D.C. motors may constitute a nuisance by reason of their generation of radio interference.

In a principal embodiment of the invention, the motor is of a design wherein a thin, disc shaped rotor containing printed circuit windings is used. The rotor is preferably made of non-magnetic material, for example a disc of dielectric material bearing on its surfaces copper windings made by printed-circuit or other techniques.

The stator itself may be suitably comprised of a magnetically hard material, for example, ferrite or other high coercive form magnetic material. In a principal embodiment of the invention the stator is in the form of an annular ring having at least a pair of permanently-magnetized areas of opposite polarity. The wafer-like rotor is mounted coaxially with the stator in fase-wise relationship thereto with its commutator segments in engagement with brush connections on the side opposite the stator. The housing enclosure for these motor elements, which forms the major portion of the magnetic path through which the stator flux passes, may thus be designed to present an extremely small and compact overall motor assembly package with attendant savings in size, weight, and mounting area. The magnetic-hold-together feature of the invention permits the motor to be installed in what would otherwise be difficult mounting positions. Because of the important advantages just described, the motor of the present invention is particularly adaptable for applications where small size, low cost, and high efficiency operation from a practical and readily available power supply (typically a battery) are of paramount concern.

The foregoing and other objects, features and advantages of the invention will be more readily understood from a consideration of the following detailed description of preferred embodiments of the invention, as illustrated in the accompanying drawings.

FIGURE 1 is a vertical sectional view of one illustrative embodiment of the invention taken through the motor assembly transversely to the brush housing.

FIGURE 1A is a partially diagrammatic, vertical sectional view of the embodiment of FIGURE 1, illustrating the principal paths of magnetic flux flow in the motor assembly, with non-ferrous elements shown in phantom outline for purposes of clarity.

FIGURE 2 is an exploded perspective view of the embodiment shown in FIGURE 1 illustrating the rapid assembly feature of the invention.

FIGURE 3 is a plan view of the brush housing with the cover removed to show more clearly the construction of its elements.

FIGURE 4 is a vertical sectional view of a detail of the brush housing taken along the line 4—4 in FIGURE 3.

FIGURE 5 is a vertical sectional view of a second illustrative embodiment of the invention taken in a plane passing through the axis of the motor assembly.

FIGURE 6 is a plan view of one side of a disc type rotor useful in connection with the embodiments of the invention shown in FIGURES 1 and 5.

FIGURE 7 is a plan view of the opposite side of the rotor of FIGURE 6.

FIGURE 8 is a schematic perspective view of the arrangement of the electrical circuitry on the rotor of FIGURE 6, the rotor disc itself being omitted in this figure for purposes of clarity.

Referring now to FIGURE 1 of the drawings, there is shown a D.C. motor having a thin, wafer-like rotor 12 mounted by bushing 77 at one end of a shaft 13. The rotor includes a supporting disc 15 which is fabricated from a dielectric material of low magnetic permeability. One such material comprises a combination of an epoxy resin and glass fibers. The rotor is preferably substantially free from any magnetic material which would interfere with the magnetic holding action.

The disc 15 is provided with conductive windings on each side thereof formed by printed or other known techniques. As may be seen in FIGURES 2 and 7, the side of the disc shown includes a common ring conductor 17, surrounding and in close proximity to the shaft 13 and bushing 77, but isolated therefrom by an insulating zone of rotor dielectric material. In some embodiments, the bushing 77 may be omitted, and instead there may be substituted a copper-clad central island inside the insulating zone for press-fitting of the rotor 12 onto the shaft 13. Disposed about the greater portion of the side of the disc surface shown are three printed circuit windings 20, 21 and 22 connected in a Y configuration and having one end of each winding connected to the ring conductor 17. These windings spiral inwardly toward connection points 23, 24 and 25, respectively.

On the opposite (FIGURE 6) side of the disc 15, there are similarly provided three corresponding printed circuit windings 30, 31 and 32 arranged in the same general Y configuration with one end of each spiraling inwardly to respective connection points 40, 41 and 42, linked by respective conductors 45, 46 and 47 to their corresponding counterparts on the other face (FIGURE 7) of the rotor 15 at 23, 24 and 25, respectively. These three windings 30, 31, and 32 on the side shown in FIGURE 6 terminate in respective commutator segments 35, 36 and 37 rather than in a common ring conductor. Thus, as most clearly shown in FIGURE 8, there are two printed circuit windings on opposite sides of the rotor 15 which are connected in series to provide each of the three conductive paths of the Y configuration. The arrangement of the windings is such that, consistent with proper utilization of the available space on the disc surfaces, a considerable portion of each circuit winding extends radially with respect to the rotor. This particular winding configuration, together with the use of a single interconnecting link for each pair of windings, enables the provision of a maximum number of turns for a given size rotor. This particular rotor winding configuration is more particularly shown and discussed in greater detail in a copending United States application of Richard J. Kavanaugh, Serial No. 123,780, filed July 13, 1961, and assigned to the assignee of the present application (now U.S. Patent No. 3,239,705 granted March 8, 1966).

Although a Y configuration of the windings is depicted in FIGURE 2, a delta configuration of three windings may also be satisfactorily utilized in the operation of the motor. Because of the limitations of printed circuit techniques, it has been found, upon a comparison with the delta, that a Y configuration of printed circuit windings provides more desirable performance characteristics when using presently available D.C. power supplies.

Other printed circuit configurations or winding numbers of other than three may be incorporated into the rotor 12 for satisfactory operation of the D.C. motor herein proposed. Rotors of the printed circuit type are especially adapted to cooperate with the magnetic-hold-to-gether features of the present invention; however, other types of rotors may be employed. Usually the magnetic-hold-together feature is best employed with rotors which are relatively thin in an axial direction, such for example as rotors of disc or wafer shape. In general, a wide variety of rotor winding arrangements may be employed in motors utilizing the magnetic-hold-together teachings of the present invention.

Coaxially mounted in spaced, juxtaposed relationship with the side of the rotor 12 shown is a permanently magnetized stator or field piece 50 (FIGURES 1 and 2). The stator is of annular configuration, generally in the shape of a cylinder, and has an outside diameter which is substantially equal to the diameter of the rotor 12. The thickness of the stator, while greater than that of the rotor, is considerably less than the stator diameter.

The stator 50 comprises a ferrite or other magnetically hard material having high coercivity and low permeability. One material which has been found satisfactory for the present purpose is barium ferrite, $BaFe_{12}O_{19}$, available commercially under the trade name "Magnadure" from the Ferrox-cube Corporation of America. This material has a high coercivity of around 1600 oersteds and a low permeability approximating that of air.

The stator contains a pair of permanently magnetized sectors or regions 52 and 53 which produce magnetic flux (lines of force) therebetween; thus there exists a resultant magnetic field extending at the stator's faces in a direction parallel to that of the common axis of the stator and the rotor. These sectors are magnetized in opposite directions, the face of one sector being of north (N) polarity and the corresponding face of the other being of south (S) polarity. The stator material, being of a magnetically hard nature, enables the orientation of the oppositely poled regions 52 and 53 in close proximity with each other. In the embodiment illustrated in FIGURE 2, there are two magnetic poles of opposite polarity and each region advantageously extends through an arc of substantially 180 degrees of the stator periphery, as indicated schematically in this figure by the arrows leading from the N and S poles. In other good arrangements, the magnetized regions of the stator may be spaced farther apart from each other and may extend through a lesser arc, for example, 120 degrees.

The face of the stator 50 opposite that adjacent to the rotor 12 is juxtaposed next to a mounting plate 55 of ferromagnetic (high permeability) material, such as iron or steel, containing an axially disposed bearing or core assembly 56 of non-ferrous material, such as aluminum, brass, bronze, or the like, through which extends the rotor shaft 13. The mounting plate 55 is shown in FIGURES 1 and 2 as a somewhat circular, broken-out section because, typically, the mounting plate 55 would be an integral portion of the apparatus which the motor is designed to drive—for example, a portion of a cover or base on which such apparatus is mounted. Magnetic holding action provided by the stator flux will generally be sufficient to secure the stator 50 firmly to the ferromagnetic mounting plate 55; however, in those extreme situations where severe shock and vibration performance specifications must be met, it may, in such cases, be preferable to provide additional fastening action by way of conventional mechanical means, such as cementing and the like.

A circular cup-shaped cover plate 60, also of ferromagnetic material, encloses the stator and rotor assembly and, through magnetic action provided by the magnetic field of the stator, securely holds the motor mechanism to the mounting plate 55, as will be hereinafter explained. Locating bosses 57 and 58 on mounting plate 55 serve to seat the cover plate 60 in proper coaxial relationship with the motor assembly. The cover plate 60 is provided with a circular center opening 64 therein which channels outward to a rivet clearance hole 112 disposed along a radius of the cover plate adjacent to which a brush assembly 61 is juxtaposed.

The brush assembly 61 is maintained and supported within the opening 64 by magnetic action provided by the stator 50 and accommodates two elongated brushes 67 and 68 which are oriented in directions parallel to the motor shaft 13. As is more clearly shown in FIGURES 3 and 4, these brushes are carried by leaf springs 70 and 71, respectively, which are secured by respective rivets 79, 80, to insulated support member 65 and which serve to bias the brushes into engagement with commutator segments circularly arranged adjacent the center of the rotor 12. A ferrous dust cover member 73 encloses the brushes 67, 68 and their leaf springs 70, 71 and is secured to the cover plate 60 by magnetic attraction provided by the stator flux. As previously stated, mechanical fastening means are particularly useful for providing reinforcement of the magnetic holding action generated by the stator flux when rigid shock and vibration requirements for the motor assembly are involved. The brushes 67 and 68 are electrically connected to a battery (not shown) or other direct current source by respective conductors 75, 76. Ventilating holes 81 and 82 provide cooling of the motor during operation by forced circulation of air drawn in from the outside by rotation of the rotor 12.

Attached to the surface of insulated support member 65 is a holding plate 69 of ferromagnetic material. This holding plate is attracted by the magnetic field set up by the stator 50 and thus holds the brush assembly 61 securely in engagement with cover plate 60 by magnetic fastening action. If desired, the brush assembly 61 could alternatively be secured to the cover plate 60 by suitable mechanical fastening means such as by bolting, riveting, cementing, etc., in which event the ferromagnetic holding plate 69 may be eliminated; however, magnetic fastening provides the important advantage that the brush housing may be removed for repair or replacement with a minimum amount of effort.

The principal paths of magnetic flux flow are shown schematically by the arrows in FIGURE 1A. As may be observed from this diagram, there are essentially three major loops or circuits that the magnetic flux generated by the stator magnet follows.

One of these paths (the inner loop) is the flux flow between the oppositely polarized sectors 52 and 53 of the stator magnet 50. This magnetic circuit may be traced starting, as a point of origin, from the north pole of the stator sector 52, across the air gap between the stator and the rotor 12, through the adjacent portion of the rotor where it interacts with the current flowing in the local conductive windings of the rotor 12 thereby providing the desired rotary moment of force, and across the air gap between the rotor and the ferromagnetic cover plate 60 to the cover plate.

The flux progresses radially inward through the cover plate 60 and then divides, a part of the flux passing through the ferromagnetic holding plate 69 of the brush assembly 61 and the remainder shunting through the ferromagnetic dust cover 73. Both of these flux paths then reunite on the other side of the centerpoint of the cover plate, and the flux continues in the cover plate radially outward until it reaches a position adjacent the oppositely magnetized stator sector 53. Here the flux crosses the air gap between the cover and the rotor 12, passes through the adjacent portion of the rotor wherein it again interacts with the current in the local conductive windings to provide a rotary moment as before, and then proceeds across the air gap between the rotor and the stator sector 53 to this latter sector. Continuing, the flux flows within the stator itself from the south pole at the upper face of the sector 53 to the north pole at the lower face. It then proceeds across the interface between the stator and the mounting plate 55 and progresses through the ferromagnetic material of the mounting plate 55 to a position adjacent the south pole on the lower face of the sector 52. Traversing the interface between the mounting plate and the stator at this point, it then returns to the assumed origin point by internal flow through the stator material itself to the north pole on the upper face of the sector 52.

The outer loops of stator flux flow, wherein the magnetic flux flows between opposite pole faces of the same stator sector, may likewise be traced as follows: again assuming the same point of origin (the north pole on the upper face of the stator sector 52, the magnetic flux emanating from this sector describes a path across the air gap between the stator and the rotor 12, through the adjacent portion of the rotor, and across the air gap between the rotor and the ferromagnetic cover plate 60 to the cover plate itself. The flux path continues in the cover plate 60, now radially outward however, to the periphery and then proceeds down the cylindrical rim of the cover plate until it reaches the interface between the edge of the cover plate 60 and the ferromagnetic mounting plate 55. The flux crosses this interface and then progresses through the mounting plate 55 to a position adjacent the south pole on the lower face of the sector 52. Traversing this interface between the mounting plate and the stator at this point, it once again returns to the assumed origin point by internal flow through the stator material itself. The corresponding magnetic flux emanating from stator sector 53 follows a similar magnetic circuit.

In some important embodiments, the ferromagnetic cover plate 60 is designed of suitably thin cross-section such that the magnetic flux flowing in the inner path readily over-saturates, and the majority of the magnetic flux is thus diverted into the outer loops described. This design is preferable in many applications as the holding action provided by the magnetic flux, which serves to secure the cover plate 60 to the mounting plate 55, is greatly strengthened when a substantial portion of the magnetic flux is directed to flow in the outer flux circuits, i.e., between opposite pole faces on the same magnetized sector, rather than in the inner flux circuit, i.e., between opposite pole faces on different sectors of the stator magnet.

It is to be noted that since the stator magnet is composed in the preferred embodiment of ferrite material, a path of extremely high reluctance exists in the stator material between the oppositely polarized sectors. Accordingly, there is great resistance to magnetic flux flow between sectors within the stator material itself and thus the preferred paths are along the circuits just described.

The two principal magnetic circuits external to the stator magnet 50 and the air gaps (consisting, in the inner loop, of the ferromagnetic cover piece 60, the holding plate 69 and the dust cover 73 for the brush assembly 61, and mounting plate 55; and, in the outer loop, of the ferromagnetic cover piece 60 and the mounting plate 55) are of extremely low reluctance. Also, the axial spacing across these air gaps is relatively small compared to the dimensions of the stator magnet which, as heretofore indicated, has a permeability approximately equal to that of air, therefore moderate variations in spacing between the stator and the cover plate do not materially affect the total reluctance of the magnetic circuit of the motor.

A magnetic field of very high intensity exists within the motor assembly notwithstanding that a stator of relatively small size and weight is employed. The strength of this magnetic field is such that it is capable, by the forces of magnetic attraction, of holding the various elements comprising the motor assembly in rigid, spaced relationship and also securing the assembly firmly to its mounting plate. More specifically, the magnetic action provided by the stator field piece 50 serves to hold (1) the stator magnet itself against the mounting plate 55, (2) the cover piece 60 also to the mounting plate 55, and (3) the brush assembly 61, through the forces exerted on its holding plate 69 and its dust cover 73, to the outside of the cover piece 60. In the brush assembly 61, the brushes 67 and 68, which are biased by leaf springs 70 and 71, then press against the rotor's commutator segments 35, 36, and 37, thereby mechanically holding the rotor 12 through its bushing 77 in axial restraint against the non-ferrous bearing assembly 56 in mounting plate 55. The securing and fastening action of the magnetic field is sufficiently great to hold the motor assembly together and in place throughout continuous operation of the motor while still permitting rapid removal and disassembly of the motor for repair and replacement with a minimum of difficulty.

FIGURE 5 is illustrative of an alternative embodiment of the invention. The rotor 12, stator 50, and mounting plate 55 are identical to that depicted in the embodiment of FIGURES 1 and 2 and the same reference numerals are here used to identify corresponding parts thereof. The cover housing in this embodiment, however, comprises two pieces, a thin annular ring 90 of non-magnetic (low permeability) material, such as brass or copper, and a flat circular cover plate 92 of ferromagnetic material. The circular plate 92 supports a brush assembly comprising an insulating strip 94 lying along a diameter and mechanically fastened to plate 92. Affixed to the insulating strip 94 is a pair of brushes 101 and 102 supplied with direct current from a source (not shown) by respective insulated conductors 105 and 106 soldered thereto. The cover plate 92 is seated on the annular ring 90 at shoulder 91 and is similarly held thereto by the magnetic attraction of the stator flux which tends to draw the cover plate in a downward direction towards the stator poles as depicted in FIGURE 5. An advantage of this particular embodiment of the invention is that the design of the brush assembly is relatively more simple and economical to fabricate than that of the embodiment shown in FIGURES 1 and 2.

Whereas various illustrative embodiments of the invention have been drawn and described showing its specific application to motors, these and other embodiments may be satisfactorily utilized as generators of electric potential by mechanically driving the rotor 12 with a prime mover and deriving voltage and current from the conductive leads of the brushes.

Although the magnetic-fastening principles of the present invention have unique advantages in electric motors and generators, they may also be advantageously employed in a number of other electrical devices having an element which moves through and interacts with the field of a permanent magnet. One illustration of such a device is a D.C. indicating instrument, for example, one having a D'Arsonval type movement; such a device may, for example, have a movement generally like that illustrated herein, but instead of rotating continuously, it may rotate through a limited arc, and a restoring force may be provided by a spring. As another example, a drag-cup or velocity-damping device may be obtained by substituting, in the embodiment shown in FIG. 1, a disc of solid copper or other metal for the current-carrying rotor windings and eliminating the brush assembly altogether. Rotation of the solid metal disc in the magnetic field provided by the stator member then creates eddy currents of relatively large magnitude, with a resultant dissipation in the form of $I^2R$ or copper loss of mechanical energy supplied to the drive shaft of the damping mechanism. Because the resultant drag or retarding force produced by this dissipation depends upon the velocity of rotation of the metal disc, such a device is useful for energy-damping and the like. It employs the field of the permanent magnet to perform the dual function of interacting with the rotating disc and holding the various parts of the drag-cup assembly together and in alignment, and has the attendant advantages of rapid and inexpensive assembly, installation, and disassembly for maintenance or for repair and replacement of parts.

The terms and expressions which have been employed here are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. In a motor of the type including a rotor and a permanent magnet providing magnetic flux for interaction with current flowing in the rotor to cause rotation thereof, a motor housing comprising a plurality of members of magnetic material held together solely by the flux from said permanent magnet.

2. In a D.C. motor, a rotor, a permanent magnet stator member providing magnetic flux for interaction with current flowing in said rotor to cause rotation thereof, and housing means comprising a plurality of parts of ferromagnetic material embracing said rotor and stator member and holding said rotor in position adjacent said stator member, the parts of said housing means being held together solely by the flux from said permanent magnet stator member, the above combination of elements comprising said motor being adapted for disassembly by being pulled apart.

3. A D.C. motor assembly comprising, a housing of ferromagnetic material including a cup-shaped cover and a mounting plate, a thin, disc-shaped rotor of essentially non-magnetic material inside said housing secured to a shaft extending through said housing for driving a load, said rotor containing thereon a plurality of windings and corresponding commutator segments, a pair of brushes carried on said cover in spring engagement with said commutator segments for supplying direct current to said windings, and an annular stator magnet mounted coaxially within said housing with said rotor and having a pair of permanently magnetized sectors of opposite polarity for producing a magnetic field which both interacts with the direct current in said windings to cause rotation of said rotor and also serves to hold said assembly securely together exclusively by magnetic attraction.

4. In a small D.C. motor adapted to be installed on a mounting plate of ferromagnetic material including bearings and a bushing therein, the combination comprising, a detachable cup-shaped cover of at least partially ferromagnetic material, said cover together with said mounting plate forming a housing, a disc-shaped rotor of essentially non-magnetic material secured to a shaft extending through said bearings for driving a load, said rotor containing thereon a plurality of windings and corresponding commutator segments, a brush assembly containing a pair of brushes in spring engagement with said commutator segments for supplying direct current to said windings, said brush assembly being carried on said cover, and an annular stator magnet mounted coaxially with and between said mounting plate and said rotor and having at least a pair of permanently magnetized sectors of opposite polarity for producing a magnetic field which interacts with direct current flowing in said windings to cause rotation of said rotor, said stator magnet also serving, by magnetic attraction, to hold itself to said mounting plate, to hold said cover in place against said mounting plate, and said brushes serving to hold said rotor against said bushing, thereby maintaining said rotor and stator in a coaxially-fixed, cooperative relationship within said housing and permitting said cover and brush assembly to be rotated relative to said stator magnet in order to optimize performance characteristics of said motor.

5. The combination set forth in claim 4, wherein said brush assembly is partially of ferromagnetic material and is held to said cover by magnetic attraction exerted by said stator magnet.

6. In an electrical device, a permanent magnet stator member, a movable conductor element for reacting with the magnetic flux of said member, said element being mounted for movement along a circular arc through said flux, and housing means for said device having a plurality of parts of magnetic material the parts of said housing means being held together and fixed in position with respect to said permanent magnet stator member solely by the magnetic flux from said member.

References Cited by the Examiner

UNITED STATES PATENTS

| | | | |
|---|---|---|---|
| 2,834,896 | 5/1958 | Fisher | 310—49 |
| 2,978,598 | 4/1961 | Kato | 310—43 |
| 3,009,225 | 11/1961 | Budreck | 317—159 X |

FOREIGN PATENTS

| | | |
|---|---|---|
| 1,232,438 | 4/1960 | France. |
| 1,231,096 | 4/1960 | France. |

MILTON O. HIRSHFIELD, *Primary Examiner.*

D. X. SLINEY, *Assistant Examiner.*

UNITED STATES PATENT OFFICE
CERTIFICATE OF CORRECTION

Patent No. 3,280,353

October 18, 1966

Arthur W. Haydon et al.

It is hereby certified that error appears in the above numbered patent requiring correction and that the said Letters Patent should read as corrected below.

In the heading to the printed specification, line 5, for "Tri-Tek," read -- Tri-tech, --; column 2, line 59, for "form" read -- force --; line 63, for "fase-wise" read -- face-wise --; column 6, line 39, for "52," read -- 52), --.

Signed and sealed this 5th day of September 1967.

(SEAL)
Attest:

ERNEST W. SWIDER
Attesting Officer

EDWARD J. BRENNER
Commissioner of Patents